United States Patent [19]

Genis

[11] 4,277,239
[45] Jul. 7, 1981

[54] SLATE FOR WRITING BRAILLE

[76] Inventor: Mariano R. Genis, 7a. Calle 3-37 Zona 1, Guatemala City, Guatemala

[21] Appl. No.: 38,487

[22] Filed: May 14, 1979

[51] Int. Cl.³ .......................................... G09B 21/02
[52] U.S. Cl. ................................................. 434/115
[58] Field of Search ...................... 35/35 A, 36, 37, 38

[56] References Cited

U.S. PATENT DOCUMENTS

| 910,330 | 1/1909 | Wait | 35/38 |
|---|---|---|---|
| 2,190,752 | 2/1940 | Brown | 35/38 |
| 2,616,198 | 11/1952 | Sewell | 35/38 |
| 2,823,468 | 2/1958 | Mora | 35/38 |

FOREIGN PATENT DOCUMENTS 16922  4/1907  United Kingdom ........................ 35/38

Primary Examiner—Ernest G. Therkorn
Assistant Examiner—David R. Sadowski
Attorney, Agent, or Firm—Owen, Wickersham & Erickson

[57] ABSTRACT

A new Braille writing slate has a front frame with a parapet on its back side, forming a template in which a blind person can quickly, easily and accurately insert a sheet of Braille writing paper. At the front of the writing slate is a cell plate of conventional design for guiding the writer's stylus appropriately into the paper below. At the back of the cell plate and the writing paper is a hinged receiving plate, also of conventional design. When the receiving plate is forced against the paper, the parapet assures the correct position and pins are engaged through holes, piercing the paper and locking it in the desired position. A back cover is hinged to the writing slate, and the engagement of the receiving plate with the paper is effected simply by a firm closing of this back cover.

5 Claims, 6 Drawing Figures

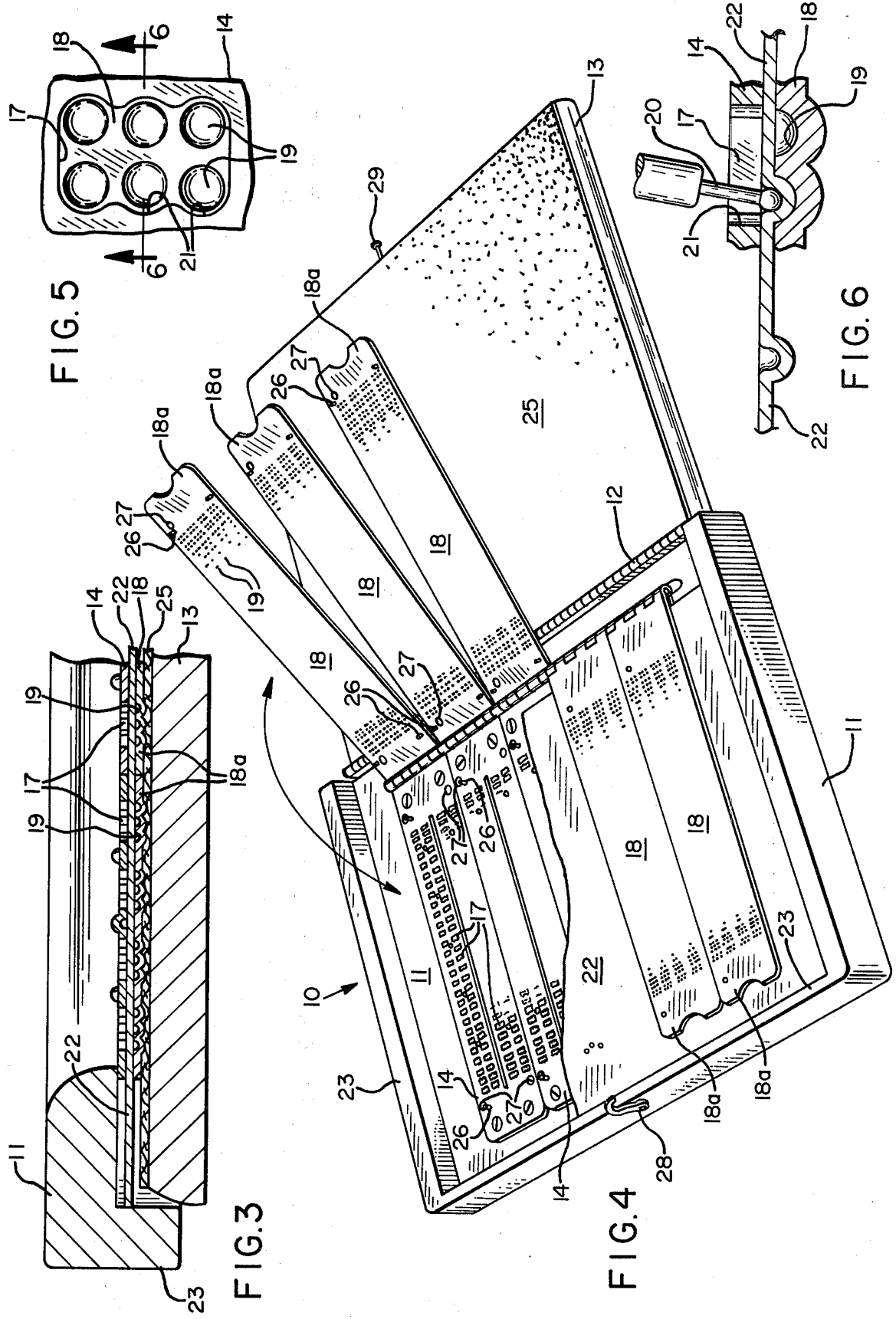

SLATE FOR WRITING BRAILLE

BACKGROUND OF THE INVENTION

The invention relates to Braille writing apparatus, and more particularly to an improved writing slate which facilitates easier and more accurate usage by a blind person.

Typically, a conventional Braille writing slate has consisted of a wooden board with series of aligned holes for positioning of a hinged cell plate and receiving plate unit which was to be moved progressively down the board for writing progressively down a sheet of paper. The paper, positioned between the cell plate and the receiving plate, was first secured to the board by abutment against an edge at the top of the slate, lateral alignment by the blind person, and the closure of a hinged member over the paper at the top of the slate, which was effective to force a pair of pins associated with the hinge through the paper and through aligned holes in the upper hinge leg.

The problem with this type writing slate was that it was cumbersome in use, and especially difficult for the blind person to initially position the paper correctly. Only a narrow abutment edge was provided, at the center top of the slate, for positioning the paper the proper distance up the slate and for assuring the paper was parallel to the slate. Lateral alignment was quite difficult, since no side edges were provided for this purpose. The lack of such side edges was in part due to the nature of the writing tablet—the board surface had to be free of obstructions so that the cell plate and receiving plate could be moved down the board and positioned as desired.

Another cumbersome feature of this prior art design was in the progressive repositioning of the hinged cell plate and receiving plate unit. It had to be partially opened to release the paper, then lifted until the bottom studs were free of the holes in the slate surface, and moved downwardly to engage the studs and a new pair of holes. All this was preferably accomplished while the paper remained stationary, engaged in the hinged device at the top of the slate. The process was very difficult for a blind person, particularly one who was just learning Braille.

There has therefore been a need for an improved Braille writing slate which can be used more conveniently, reliably and efficiently by the blind person. Such an improved writing slate was not available until the present invention described below.

SUMMARY OF THE INVENTION

The present invention provides a new slate for writing Braille, with the capability of simple and quick location and placement of the paper behind the cell plate and an easy means of engagement of the receiving plate over the back of the paper to lock the paper in the desired location.

The Braille writing slate includes a metallic or plastic cell plate with the small rectangular openings with guide grooves that frame each Braille sign. The dimensions of the plate are such that the desired standard size of paper can be totally covered. This plate is affixed to the back side of an open rectangular frame which can be made of wood, plastic, fiberglass or other adequate material that is rigid, strong and durable. The frame has an overlapping border or parapet on its back side, forming at three sides of the back a lip which plays a very important role in the operation of the writing slate. The parapet forms a limited quadrangular space, or "crib", the same size as the paper to be used. This constitutes a very important feature of the slate because the paper is placed in it with ease and accuracy and the paper cannot move, not even a very small distance, while a paper is being written or partially or totally read. If the paper is removed and then replaced in the slate, it will assume the same position with no change whatsoever because the parapet quickly locates the paper properly for reengagement with pins that originally pierced the paper.

The frame which surrounds the cell plate adds comfort and assurance to the slate because it perfectly confines the writing area aiding in the localization of the upper, lower and lateral margins. For the blind it is of great help being able to find these margins by touch or with the stylus. The frame can also be helpful as a guiding device for aligning a column, such as a column of figures. Strips of cardboard or plastic of known width can be laid against one of the vertical inner edges of the frame, so that the operator can easily locate a straight vertical column on the paper. Alternatively, the frame can include series of locating bores for metal or plastic guide strips to extend from top to bottom for column delineation.

The thickness of the frame can vary as desired, but it is preferably relatively thin, for example about 3/16 of an inch, and with rounded edges.

The cell plate is of one piece so that the paper is covered all at once, omitting having to slide and relocate the cell plate unit every four lines as in prior Braille slates. This helps the operator feel secure, since he never has to slide the cell plate and there is no danger of moving the paper since it is positively secured within the elements of the slate.

The cell plate is of course affixed to the back of the frame, and to one edge is hinged the receiving plate, which may comprise a series of separate receiving plates. The hinge is at the side adjacent to the open edge of the frame back, where the parapet is discontinued. Separate receiving plates are preferably used, so that the operator can open one at a time, if desired, to read what he has written.

As in standard Braille slates, each separate receiving plate contains 4 rows of groups of indentation dots (6 dots each) which form the well known generating sign for Braille. For a writing slate with 20 lines, 28 characters each line, 5 receiving plates are used; for 24 lines, 6 plates are used. This refers to a letter size paper, but the slate can be made larger to accommodate the larger size paper, in which case seven receiving plates of 4 lines each would be used, with 40 cells each line.

The cell plate has a series of protruding raised "veins", some smooth and some dotted, parallel to and between lines of cells, appearing alternately, for example, every four lines. These veins must be very perceptible to the touch of the blind. For his convenience, the smooth veins will appear every four lines and the dotted veins every four lines separating each receiving plate.

The receiving plates can vary in size. There can be 4, 6 or 8 lines in each, as desired.

In the writing slate of the invention the paper can be placed accurately within the frame, always in a square manner without the difficulty of having to find the square as in other slates. Once the paper is in place, the receiving plates are closed and the paper is completely secure and immobilized in its place, guaranteeing that the writing is always square and even, without danger of any lines of writing being formed unevenly or angularly.

The slate also includes a rigid back board or plate, constituting a novel and important feature of the invention. The hinged receiving plates on the back side of the frame are kept in place by this additional board which is hinged to the edge of the frame where the back parapet or lip is interrupted, which preferably is the right side. When this board is closed into the back of the slate, it goes into the frame making firm contact with the receiving plates, forcing them against the paper and thereby engaging conventional locating pins through the paper and into holes provided in registry with the pins. The board is covered on its contact surface with felt or other flexible material that may serve as a cushion so the Braille puncturing is easier and more comfortable.

The back board should fit closely in the crib of the paper with thickness sufficient so that it protrudes out beyond the parapet by a short distance, for example 3/16 of an inch, so as to support firmly all the receiving plates when placed on a table.

The hinge that secures this board may be of any construction and material as long as it has an easy swing. A simple fabric hinge is soft and comfortable but in general a metal hinge is preferred. The close tolerance afforded by a metal hinge helps in forcing the receiving plates into place upon closure of the back, since only the outer, free edge of the back need be pressed closed.

When the back board has been closed and applied against the receiving plates, it may be secured in place by one or two latches which keep the slate securely closed during its many manipulations and prevent it from accidentally opening if dropped. The latch must be easy to open with one motion since the board must be opened when necessary to inspect what has been written. This operation can be done with the present slate simply by turning it and lifting the corresponding receiving plate, opening the desired four lines for reading, or more lines if an adjacent plate is also opened. During these inspection movements the paper never moves even if the operator is careless or inexperienced, which adds great comfort and assurance to the use of this slate.

The described slate construction has the special feature of allowing for the writing of several sheets of paper at once, providing the added convenience of being able to make two, three or even six copies of what is being written.

Accordingly, in one embodiment the Braille writing slate of the invention comprises a frame forming a generally rectangular opening, a cell plate affixed to the frame and having a plurality of rows of cell openings for forming Braille characters with a stylus, a receiving plate mounted behind the cell plate at the back of the frame, with hinge means mounting the receiving plate at one side of the frame and of the cell plate such that a sheet of Braille writing paper can be interposed between the cell plate and the receiving plate, said cell plate and receiving plate having aligned pins and holes for piercing and locking the paper in place when the receiving plate is closed against the cell plate; said frame having a rearwardly protruding lip extending around three sides and forming a paper locating and confining space closely fitted to the size of the paper, so that the operator can by touch easily insert the paper properly within the confining space against the edges formed by the lips, then close the receiving plate over the paper to lock it in place; and a back plate sized to fit against the back of the receiving plate within the space formed by the lip, and having a thickness sufficient to extend outwardly beyond the protrusion of the lip when the receiving plate is closed and the back plate is fitted against it, whereby the receiving plate is pressed firmly against the paper when the writing slate is placed on a table.

It is therefore among the objects of the invention to provide an improved Braille writing slate having features enabling easy and confident use by the blind, with assurance that the paper is correctly inserted and that all lines of writing will be straight and parallel. These and other objects, advantages and features of the invention will be apparent from the following description of a preferred embodiment, taken in conjunction with the accompanying drawings.

DESCRIPTION OF THE DRAWINGS

FIG. 3 is a fragmentary sectional view taken along the line 3—3 of FIG. 1.

FIG. 4 is a rear perspective view showing the writing slate with its back plate opened and several receiving plate strips lifted.

FIG. 5 is an enlarged detail view showing a cell of the cell plate lying over corresponding depressions of the receiving plate.

FIG. 6 is a sectional view taken along the line 6—6 of FIG. 5, illustrating a sheet of writing paper punched or deformed by a stylus into the receiving plate to form a Braille character.

DESCRIPTION OF A PREFERRED EMBODIMENT

Figure 1:
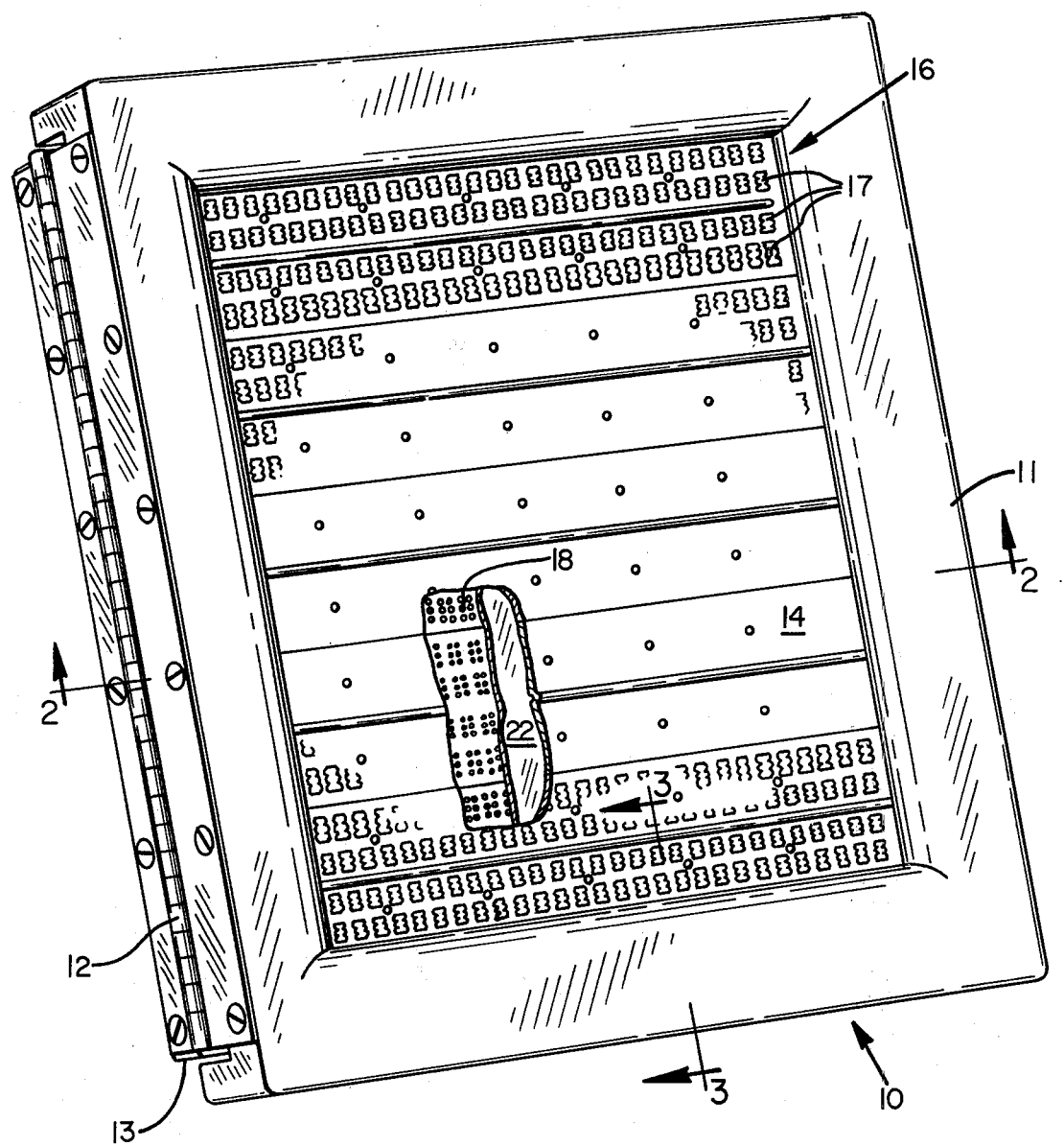
FIG. 1 is a frontal perspective view showing a Braille writing slate according to the invention in a position for writing.
Figure 2:
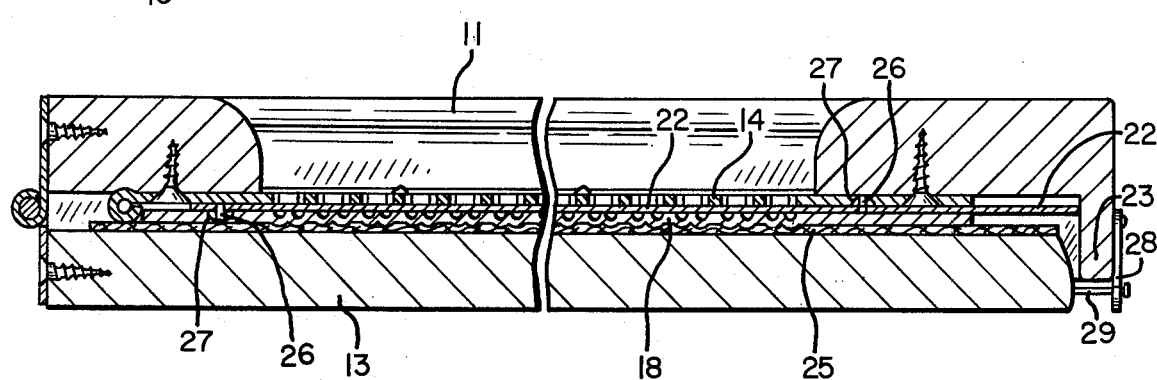
FIG. 2 is a sectional view taken along the line 2—2 of FIG. 1.

In the drawings, FIG. 1 shows a slate for writing Braille generally indicated by the reference number 10, and having a frame 11 which may be connected by a hinge 12 to a back board or plate 13 (See also FIG. 2). Secured to the back side of the frame 11 is a cell plate 14 having a series of rows 16 of the standard type Braille character forming cells 17. One of these cells 17 is shown in FIG. 5. A receiving plate 18 is seen through the cell 17, and the receiving plate is also visible in the cut-away portion of FIG. 1. As FIGS. 5 and 6 indicate, the receiving plate includes six depression dots 19 aligned with each cell 17 of the cell plate 14. Rounded guide grooves 21 are formed in the edges of each cell 17 to guide a stylus 20 in the formation of Braille characters in a sheet of paper 22 sandwiched between the plates 14 and 18. The shape and structure of these character forming plates are typical of conventional Braille writing apparatus, and do not form a part of the invention.

As indicated in FIGS. 2, 3 and 4, the frame 11 includes a border or parapet 23 extending rearwardly and forming a lip which is preferably included only on three sides as shown. This forms a partial enclosure or "crib" for easy and accurate insertion of the paper 22 by the blind person. Since the parapet is preferably closely dimensioned to the size of a standard sheet of Braille writing paper, the desired position of the paper is readily located by the operator.

FIG. 4 illustrates that the receiving plate 18, hinged to the back side of the cell plate 14 or to the frame 11, may consist of a series of separate plate strips 18a. As discussed, this enables the operator to lift one strip of four lines at a time if he desires, for reviewing what has been written on the paper 22. If this feature is not needed, the receiving plate can comprise a single unit, and the term "receiving plate" as used herein and in the appended claims is intended to refer to either arrangement.

There is also preferably included a sheet of flexible material 25 adhered to the inside surface of the back board or plate 13, for cushioning the writing operation and to assist in the compression of the receiving plate 18 against the paper as discussed above. Such material may be felt, for example.

As can be envisioned from FIG. 4, in operation of the improved Braille writing slate of the invention, the slate 10 is first turned over to expose its back side, then the back board 13 is opened as shown. Next the receiving plate 18, or the entire series of receiving plate strips 18a, are lifted to the open position, whereupon a sheet of Braille writing paper 22 is inserted in the crib space formed by the lip or parapet 23. The paper thus lies against the back side of the cell plate 14. When the paper has been thus inserted, the receiving plate 18 (or plates 18a) is closed upon the paper, then the back board 13 is closed tightly, forcing the receiving plate against the paper. As discussed previously, this causes a number of small pins 26 to be forced through the paper and into corresponding holes 27 of the respective plates. The pins and holes are conventional in Braille writing apparatus. This fixes the paper in the desired position and assures that even if it is removed and replaced, the parapet 23 will cause it to again assume the same position so that the Braille characters remain aligned and in registry with the plates.

The frame arrangement of the invention also has other advantages, one of which is that if the user of the slate is interrupted in his writing, he may easily mark his place on the paper. This may be done by opening the back board 13 and opening the receiving plate(s) 18 as shown in FIG. 4, then feeling the last written character on the paper (the writing is read from this side) and inserting a pin through the paper at this point. Upon resumption of the writing, the pin can easily be found.

The Braille writing slate 10 may also include a simple form of latch device for holding the back board tightly against the receiving plate in use. This may simple comprise a swingable hook 28 on the frame 11, engageable with a stud or catch 29 extending from the edge of the backboard 13. Such a latch is easily manipulated by the blind.

When the Braille writing slate 10 of the invention is to be used, it is simply placed on a table or other surface in a closed position, which is illustrated in FIGS. 1, 2 and 3. The back board 13 is of sufficient thickness that when closed, it will protrude somewhat beyond the lip or parapet 23 as shown, assuring that the receiving plate 18 will be adequately supported and engaged against the paper 22 for best results.

The above described preferred embodiment provides an improved Braille writing slate which is much easier for the blind to operate, both in the initial insertion of the paper and in subsequent writing and reviewing steps. Various other embodiments and modifications to this preferred embodiment will be apparent to those skilled in the art and may be made without departing from the spirit and scope of the invention as defined by the following claims.

I claim:

1. A slate for writing Braille comprising:
   a frame forming a generally rectangular opening;
   a cell plate affixed to the frame extending across the opening and having a plurality of rows of cell openings for forming Braille characters with a stylus;
   a receiving plate having indentations therein and hinged to one end of the cell plate such that a sheet of Braille writing paper can be interposed between the cell plate and the receiving plate, said cell plate and receiving plate having aligned pins and holes for piercing and locking the paper in place when the receiving plate is closed against the cell plate;
   said frame having an upstanding wall means extending about three sides and forming a paper locating and confining space closely fitted to the size of the paper so that the operator can by touch easily insert the paper properly within the confining space against the edges formed by the wall means then close the receiving plate over the paper to lock it in place; and
   a back plate movably attached to the frame and sized to fit against the receiving plate within the space formed by the wall means, and having a thickness greater than the height of the wall means sufficient to extend outwardly beyond said wall means when the receiving plate is pressed firmly against the paper when the writing slate is placed on a table with the back plate at the bottom.

2. The Braille writing slate of claim 1 wherein the receiving plate comprises a series of separate adjacent receiving plate strips, each separately mounted by said hinge means, whereby each may be individually opened if desired for reading what has been written on the paper.

3. The Braille writing slate of claim 1, wherein the back plate is movably attached by hinge means connecting the edge of the back plate to the back of the frame at an edge thereof where said wall means is discontinued, so that when the back plate is pivoted to a closed position with a sheet of writing papers positioned within the confining space between the cell plate and the receiving plate, the receiving plate is forced toward the cell plate, piercing the paper with said pins and locking the paper in place.

4. The Braille writing slate of claim 3, further including a latch for securing the back plate to the frame when the back plate is in said closed position.

5. The Braille writing slate of claim 1 wherein the back plate includes a sheet of flexible cushioning material providing a shock absorbing cushion for writing and aiding in the compression of the receiving plate against the paper when the back plate is closed.

* * * * *